July 9, 1968  L. SCHAFER  3,391,655
PASTRY ROLLING DEVICE
Filed Aug. 29, 1966  2 Sheets-Sheet 1

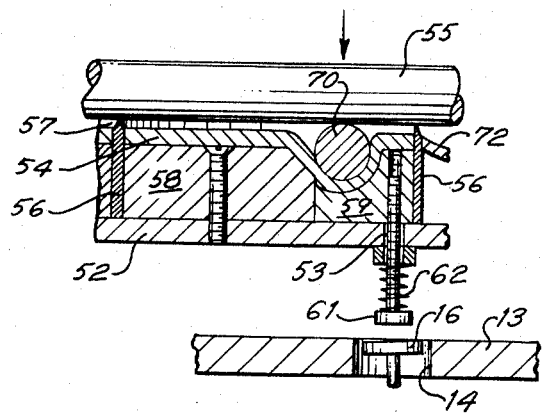
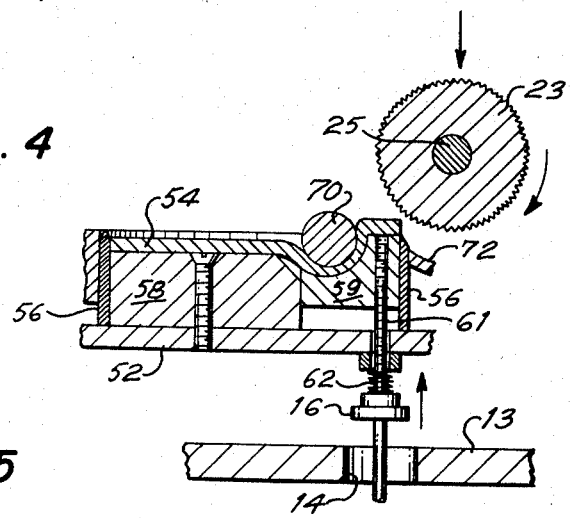
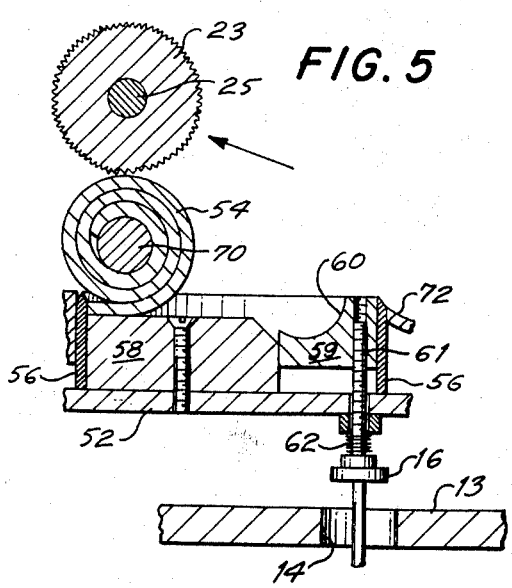
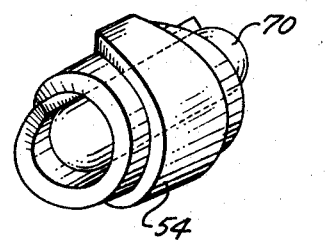

United States Patent Office 3,391,655
Patented July 9, 1968

3,391,655
PASTRY ROLLING DEVICE
Leonhard Schafer, 219 Miriam St.,
Bronx, N.Y. 10458
Filed Aug. 29, 1966, Ser. No. 575,661
9 Claims. (Cl. 107—1)

ABSTRACT OF THE DISCLOSURE

This invention relates to an apparatus and method of rolling a pastry blanket about a filling disposed thereon. The apparatus employed comprises an advancing corrugated rotating roller suitably predisposed so that the advancing rotating lead side of the roller engages the underside of an edge portion of a stationary blanket adjacent the filling and thereafter continuously engages said undersurface with an upwardly movement of the advancing roller whereby the blanket and the filling thereon is rolled up to form a desired rolled-up pastry unit.

---

This invention relates to a device for rolling a suitable cut piece of pastry about a filling.

It is an object of this invention to replace hand rolling of pastry by a machine rolling of said pastry.

These and other objects of this invention will become apparent upon reading this following descriptive disclosure of an illustrative embodiment shown in the accompanying drawing in which.

Figure 1:
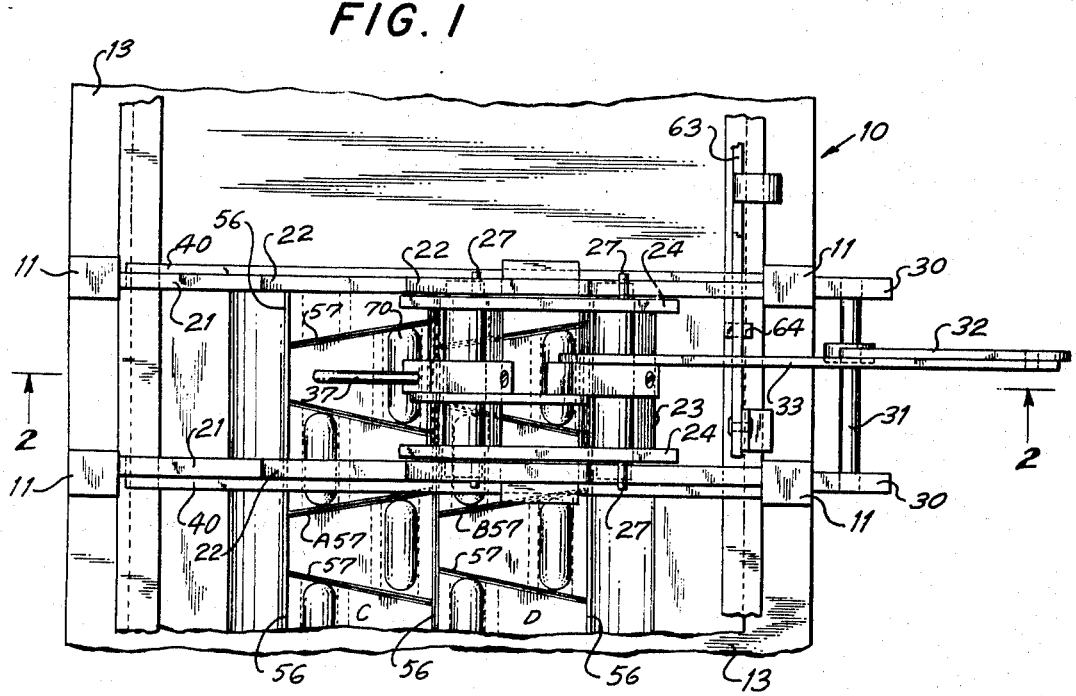
FIG. 1 is a top plan view of the device.

FIG. 3 is a detail view of the manner of roller cutting the pastry after filling the die holder with a filling, for example, a cocktail frankfurter, FIG. 4 is a schematic side elevation view of the manner of engaging the lifted pastry by a corrugated rotating wheel, FIG. 5 is a schematic side elevation similar to FIG. 4, showing how the suitably rotating corrugated roller wheel moves slopingly upward as it moves laterally against the pastry causing the pastry to roll over filling and upon itself, and FIG. 6 is a perspective view of the finished pig-in-a-blanket pastry product.

This invention is used to prepare pastry rolled cocktail frankfurters but other fillings may be used in lieu of small frankfurters.

Turning to the drawing, a suitable longitudinal framework 10 generally made of angle iron is provided with a plurality of vertical legs 11 at roller stations thereon. A plurality of supports 12 are welded to the legs 11 and a longitudinal plate 13 is bolted thereto by nut and bolt assemblies 14X.

The plate 13 extends the full longitudinal length of the device and is provided with suitably located apertures 14 therein. A leaf spring 15 is bolted at one end to a support 12.

The spring 15 is provided with suitably spaced threaded apertures in which threaded push rods 16 are adjustably threaded and located in the apertures 14 of the plate 13.

Figure 2:
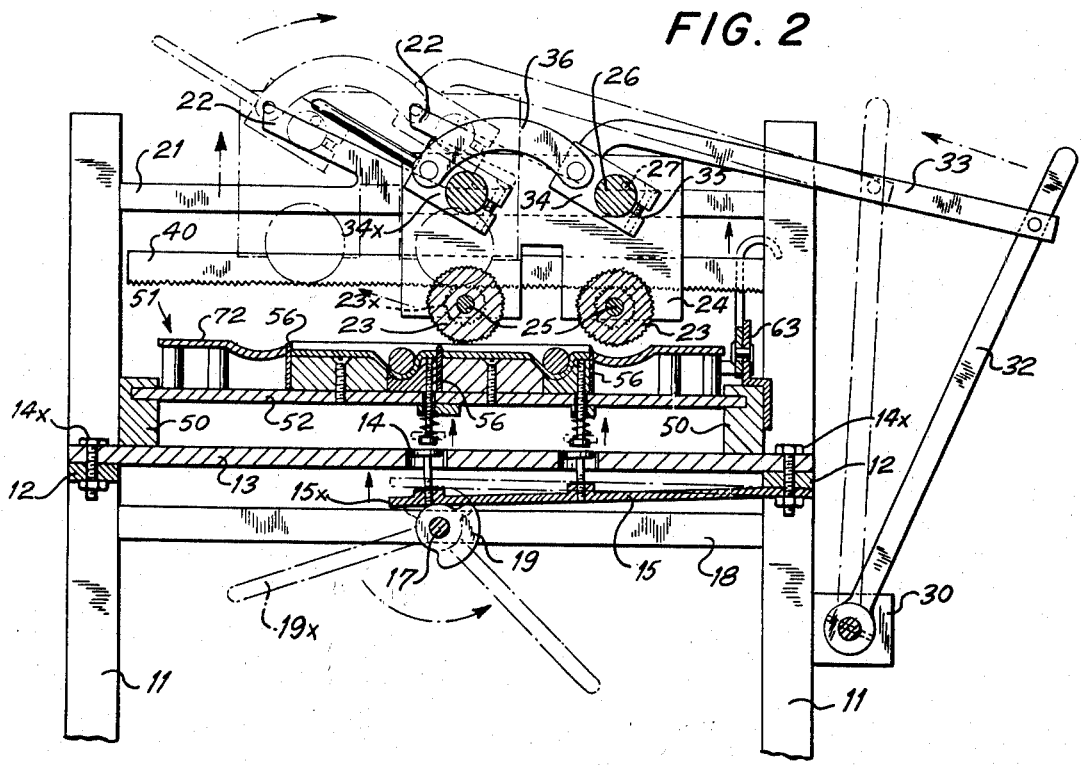
FIG. 2 is a side view of the device, partly in section.

The free end 15X of the leaf spring 15 is continuously urged downwardly (FIG. 2). A cam rod 17 is disposed between a pair of spaced framework cross arms 18 which latter are secured to legs 11. A cam 19 of suitable predetermined height is keyed to said rod 17 and is adapted to raise the free end 15X of the spring a predetermined amount. A handle 19X is keyed to the rod 17 so that the spring 15 is actuated as desired.

Above the plate 13 and between opposed legs 11 there is located a parallel pair of spaced-apart cross arms 21. The cross arms 21 preferably are each provided with a sloped upward or incline portions 22. As shown in FIGS. 1 and 2, the specific device illustrated will roll two pastry units at one time. However, the device can be altered within the skill of the art to roll one or three or more units located in linear alignment. Moreover, where the corrugated rollers are long enough, they may roll two or more side by side pastry units simultaneously. Clearly, therefore this device may roll many pastry units simultaneously and successively linearly in one continuous movement of the corrugated roller.

In the device shown herein, two pastry units are linearly rolled simultaneously in a right to left motion (FIG. 2) of the corrugated roller.

To produce a tandem operation of the corrugated rollers 23, hereinafter more fully described, a pair of housing plates 24 are provided and the rollers 23 are journaled therein by axles 25 in suitable apertures. The top portions of the plates 24 are also provided with suitable apertures and a pair of large diameter captive rollers 26 are journaled therein. The rollers 26 are each provided at their opposed flat ends with cam pins 27 which carry the weight of the assembly including the plates 24 and corrugated rollers 23.

The cam pins 27 slide on the respective edges of the cross arms 21.

In order to manually propel the rollers 23 as a unit, a hand operated lever assembly is shown. In this assembly a pair of apertured supports 30 are welded to opposed legs 11 and an axle 31 is disposed therein. A lever handle 32 is secured to the axle 31 by a conventional lock pin. A link bar 33 of suitable contour is journaled at one end to the lever handle 32 and is journaled at the other end to a split end securing block 34. The block 34 is provided with a circular recess to receive a roller 26 and with conventional threaded bolt means 35 at its other end and adapted to seize the roller 26 in captive non-rolling engagement as desired, in order to selectively locate the cam pin 27.

As shown in the two place corrugated rollers illustration of this invention a bridge link 36 is provided to secure a second split block 34X in tandem to block 34. A stick handle 37 is secured to block 34X for selective movement of the block 34X and 34 and hence of the plates 24 and rollers 23 and will be described hereinafter.

Each of the axles 25 to which a corrugated roller 23 keyed is provided preferably at each end with a keyed gear 23X so that the axle 25 and the roller 23 and the gear 23X roll as a unit against the pinion bar 40 disposed by gravity on said gears 23X between two opposed legs of the framework.

In operating the device, the handle 32 is moved leftwardly (FIG. 2) causing the locked cam pins 27 to slide on the horizontal edge of the cross arms 21 and then to slide up the inclines 22 while the rollers 23 are continuously rolling in clockwise manner due to the linear teeth of the pinion bar 40.

An important feature of this invention is the provision of suitable trays for receiving the pastry dough and its filler, for example, a small frankfurter. The trays shown in FIGS. 1 and 2 are slidably mounted on channeled longitudinal opposed rails 50 secured as by welding to the plate 13; however, in the case of a fully automated device the trays would constitute a continuous conveyor by use of a pair of opposed securing side chains of conventional manufacture.

The trays 51 are each provided with a flat base plate 52 which is slideably disposed at each side in the channel of a respective rail 50.

The base plates 52 are provided with suitably located apertures 53 (FIGS. 3 to 5). The trays 51 may be two units wide (FIG. 2) in which case two corrugated rollers 23 are used. However, the trays are preferably four or more units wide, so that for single width rollers 23, four or more pastry units are rolled up at one stroke. Moreover, where the rollers 23 are wide enough to roll two or more pastry units along its corrugated width it is clearly seen that the device of this invention will simultaneously roll one, two or more dozen pastry units at a single movement of the lever arm 32.

Returning to the trays 51, it is seen that they are built up of upright walls having cutting edges and which outline several truncated isosceles triangles in tandem and in an inverted side by side relationship. Thus triangles A and B (FIG. 1) are in linear tandem relationship yet two of the sides of triangles A and B form two sides of triangles C and D that are faced in an inverted or opposite orientation to triangles A and B. This arrangement permits a pastry blanket 54 to be roller cut by a rolling pin 55 with no waste of the pastry blanket between the various triangles.

The trays 51 are provided with vertical longitudinal cutting edge walls 56 that run the length of the tray. The sloping sides of the triangles are provided by upright walls 57 which function for the triangle on each side thereof. The area within each truncated triangle is provided with a fixed block 58 of smaller height compared to the cutting walls 56 and 57 so as to be suitably recessed within the triangle to permit receiving the cut pastry dough blanket 54. Since the height of the cutting edge walls 56 and 57 are equal above the base plate 52 a dough pastry sheet or blanket 54 disposed on the tray and rolled by pin 55 against these cutting edges causes the dough to be pushed into the recessed chamber of the respective triangles.

Another important feature of this invention is the provision of a moveable block in each triangle to permit an upward movement of a selective portion of the triangle dough a predetermined height. To produce this result, the trays 51 within each triangle are provided with a captively held moveable block 59. The block 59 forms the base of the triangle and is provided with a quadrant circular surface 60. A threaded aperture is provided in block 59 and a threaded bolt 61 is passed through aperture 53 in the base plate 52 and secured adjustably into said block 59. A coil spring 62 is disposed about the bolt 61 and against the bolt head thereof causing the block 59 to be normally seated against plate 52.

This invention is also provided with a swingable finger operated lock bar 63 having a notch therein adapted to engage a lock bar 64 disposed on each tray so that the tray is locked against movement with the respective push rods 16 being directly below the respective threaded rods 61 of the many moveable blocks 59.

In the overall operation of the device of this invention, the pre-cut pastry dough sheet is placed on a respective tray 51, and a small frankfurter 70 added on top of the pastry in the area of the well of the triangular surface 60. Next, the rolling pin 55 is rolled over the dough 54 of suitable thickness (FIG. 3) cutting the dough and forcing it into the triangular dies or molds A, B, C, D, etc.

The prepared tray 51 is then slideably mounted in rails 50 and moved until locked by bar 64 of a tray engaging the channel of lock bar 63.

Next, the hand crank 19X is turned so that cams 19 force the push rods 16 to engage the threaded rod 61 causing the dough 54 to be suitably lifted above the height of the cutting walls 56 (FIG. 4).

Thereafter with the corrugated rollers 23 at their normal position, the hand lever 32 is moved leftwardly (FIGS. 2 and 4). This leftward movement of handle 32 pushes the plates 24 and their assembly leftwardly but the pinion bar 40 being weight mounted on gears 23X are not moved leftwardly since they are disposed loosely between the confining legs 11, albeit these bars 40 can rise with the plate assembly as the cam pins 27 are pushed up the inclines 22.

The overall result is that the corrugated rollers 23 having suitable corrugations on their surface, pick up the edge of the base of the cut triangular pastry dough (FIG. 4) by the clockwise rotation of the roller 23. The roller 23 is adjusted so as to just clear the cutting wall 56 at the time of contact with the pastry dough 54. Continued leftward movement of handle 32 causes the roller 23 to roll up the dough with the filling therein as the roller 23 climbs above the tray 51 due to the cam pins 27 being pushed against the incline 22.

Accordingly, the length of movement of the pastry surface that is rolled up is directly related to the length of travel of the surface of contact made with the corrugated surface on the roller 23. In short, there is no slippage between the roller 23 and the dough 54 which it engages in what might be viewed as a geared relationship, since the relatively soft dough receives the hard corrugations of the corrugated metal wheel 23 with ease. Thus a well formed convoluted product (FIG. 6) is obtained for the first time in this art.

The formed product (FIG. 3) may be rolled by continued movement of the lever 32 onto the apron 72 of the tray or the corrugated rollers 32 can be lifted well above the product (FIG. 6) by movement of the stick handle 37 to the right (FIG. 2) causing the housing 34 and the plates 24 and the assembly to move upward due to the eccentric location of the cam pins 27 resulting in a cam action by said pins. Where the corrugated roller assembly is lifted clear of the tray, the tray 51 can be unlocked at the lock bar and the tray advanced from under the operating station to permit hand pick of the rolled product from the tray.

Clearly, an identical lever 32 assembly located to the left of the device (FIGS. 1 and 2) and moved rightwardly would roll up the pastry units C and D, the base of which are disposed to the left (FIGS. 1 and 2).

Accordingly, the preferred form of this invention comprises a leftward rolling up station for A and B type triangles and also a rightward station for rolling of C and D type triangles (FIGS. 1 and 2).

Moreover, the invention may be automated to have leftward rolling up of pastry going on simultaneously with rightward rolling up at stations suitably removed from one another.

What is claimed is:

1. A device for rolling filled pastry blankets comprising a longitudinal framework having a predetermined apertured longitudinal base plate thereon; spring means having suitably disposed push rods thereon disposed beneath said base plate with the push rods located below said apertures of said base plate; selectively operated cam means adapted for raising said push rods and secured to said framework; a pair of longitudinal parallel disposed rails secured to said longitudinal framework base plate, said rails each having a suitable channel adapted to receive a tray slidably therein; a tray having knife edge rims forming a plurality of rows of truncated triangular cavities disposed in contiguous and in alternate opposed relationship, said trays having an upwardly movable filling receiving bottom section adjacent the base of each triangular cavity and adapted to engage said push rods; transverse parallel spaced-apart cross arms secured to said framework fixedly above said longitudinal framework and transversely across said base plate; housing means slidably mounted on said parallel cross arms; corrugated roller means having a gear thereon secured to said housing means and adapted to move transversely suitably above said tray; lever means secured to said housing means and selectively operated to move said corrugated roller means and a pinion bar means engaging said corrugated roller means whereby movement of said lever means effects a transverse movement of said roller means with clockwise rotation of said corrugated roller against a pastry blanket raised by said bottom portion of said cavity above the knife edges thereof to thereby convolute the pastry about said filling.

2. The device of claim 1 comprising incline means secured to said cross arms whereby movement of said housing means slidably on said cross arms causes said transversely moved corrugated roller means to gradually move upwardly against a filled rolled pastry sheet of gradually increasing diameter.

3. The device of claim 2 comprising spring loaded means secured to said filling receiving bottom section for continuously urging said section away from the knife edges outlining said triangular cavities.

4. The device of claim 3 comprising split block secured to said lever means and a roller having end cam pins engaging said cross arms, said roller rotatably secured within said split block and handle means secured to said block for eccentrically elevating said housing means on said cam pins.

5. The device of claim 4 comprising a plurality of corrugated roller means co-acting with a plurality of separate filled pastry blankets, and means for predetermined locking of said tray below said corrugated means.

6. A longitudinal pastry tray for rolling up filled pastry comprising a base plate adapted at each end for movement thereof; a plurality of vertically disposed longitudinal parallel spaced-apart walls having knife edge rims suitably disposed on said base plate to form respectively the base and the truncated tops of triangular cavities; a plurality of upright walls having knife edge rims so disposed within said parallel walls as to form the sides of adjacent isosceles triangular cavities disposed in opposed relationship; truncated blocks disposed fixedly within each triangular cavity at the top section thereof; and a bottom filling receiving section movably disposed at the bottom of said triangular cavity.

7. The pastry tray of claim 6 comprising a bottom section having a curved top wall; said base plate having an aperture below each bottom section; threaded bolt means secured to said bottom section and extending through each of said apertures and coil spring means co-acting with said bolt means for urging continuously said bottom section away from said knife edges of said rims outlining said cavities.

8. The method of convoluting a pastry blanket around a filling comprising placing a pastry blanket together with a filling upon a tray having a plurality of upwardly directed knife edges disposed in a predetermined manner to form a plurality of adjacent truncated triangular cavities; pressing said blanket and filling into said cavities thereby cutting the blanket into the shape of said cavities; lifting a portion of the base of the respective filled pastry blankets above the base edge of the respective triangular cavities and rolling up the pastry blanket upon itself and the filling by means of a cylindrical corrugated roller suitably engaging the lifted edge.

9. The process of claim 8 wherein the corrugated roller is moved linearly and the lead side moves upwardly with advancing rotation whereby the soft pastry blanket is rolled over said filling.

References Cited

UNITED STATES PATENTS

| 2,674,209 | 4/1954 | Anetsberger et al. | 107—9.2 |
| 3,022,616 | 2/1962 | Eiden et al. | 107—10 XR |

WALTER A. SCHEEL, *Primary Examiner.*

A. O. HENDERSON, *Assistant Examiner.*